Figure 1:
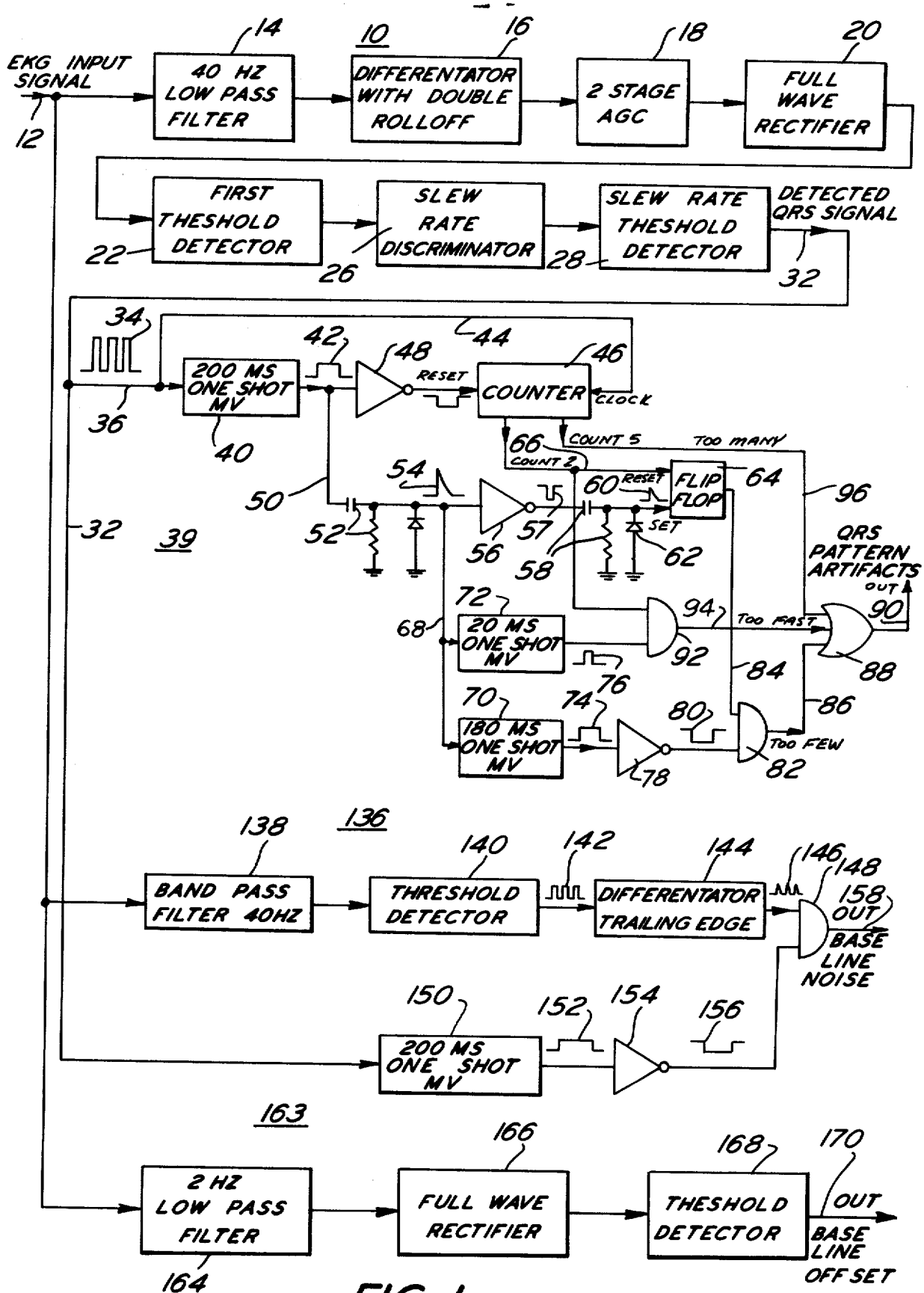

United States Patent
Shakespeare

[11] 3,903,874
[45] Sept. 9, 1975

[54] CARDIOGRAPHIC SIGNAL PROCESSING MEANS AND METHOD

[75] Inventor: Charles B. Shakespeare, Phoenixville, Pa.

[73] Assignee: Mediscience Technology Corporation, Cherry Hill, N.J.

[22] Filed: Aug. 27, 1973

[21] Appl. No.: 392,065

[52] U.S. Cl. .......................... 128/2.06 A
[51] Int. Cl. ............................. A61b 5/04
[58] Field of Search ..... 128/2.06 A, 2.06 F, 2.06 R, 128/2.06 B

[56] References Cited
UNITED STATES PATENTS

| | | | |
|---|---|---|---|
| 3,352,300 | 11/1967 | Rose | 128/2.06 A |
| 3,510,765 | 5/1970 | Boessler | 128/2.06 A |
| 3,552,386 | 1/1971 | Herth | 128/2.06 A |
| 3,587,563 | 6/1971 | Ragsdale | 128/2.06 A |
| 3,593,705 | 7/1971 | Thomas et al. | 128/2.06 A |
| 3,605,727 | 9/1971 | Zenevich et al. | 128/2.06 A |
| 3,606,882 | 9/1971 | Abe et al. | 128/2.06 A |
| 3,699,946 | 10/1972 | Michel | 128/2.06 A |

Primary Examiner—William E. Kamm
Attorney, Agent, or Firm—Jacob Trachtman

[57] ABSTRACT

A cardiographic or EKG signal processing means comprising first means having an input for receiving a cardiographic information signal and delivering an output signal related to the differential of the input signal, and second means receiving the output signal from the first means and delivering an output pulse signal for each input signal exceeding a predetermined amplitude, whereby the processing means receives an amplitude varying cardiographic input signal and responsively produces a digital signal having one or more related pulses. A third means of the signal processing means delivers an indication signal responsive to receiving more than a predetermined number of pulse signals of an output signal from the second means during a predetermined period, fewer than a predetermined number of pulse signals during a predetermined period, and when the rate of occurrence of such pulse signals of an output signal from the second means exceeds a predetermined rate, for indicating that the derived pulse signals do not correspond to a true cardiographic signal but are to be considered artifacts. A means is also provided for producing an output signal indicating base line noise in the cardiographic or EKG signal, as is a means for indicating base line offset in the received cardiographic signal.

33 Claims, 10 Drawing Figures

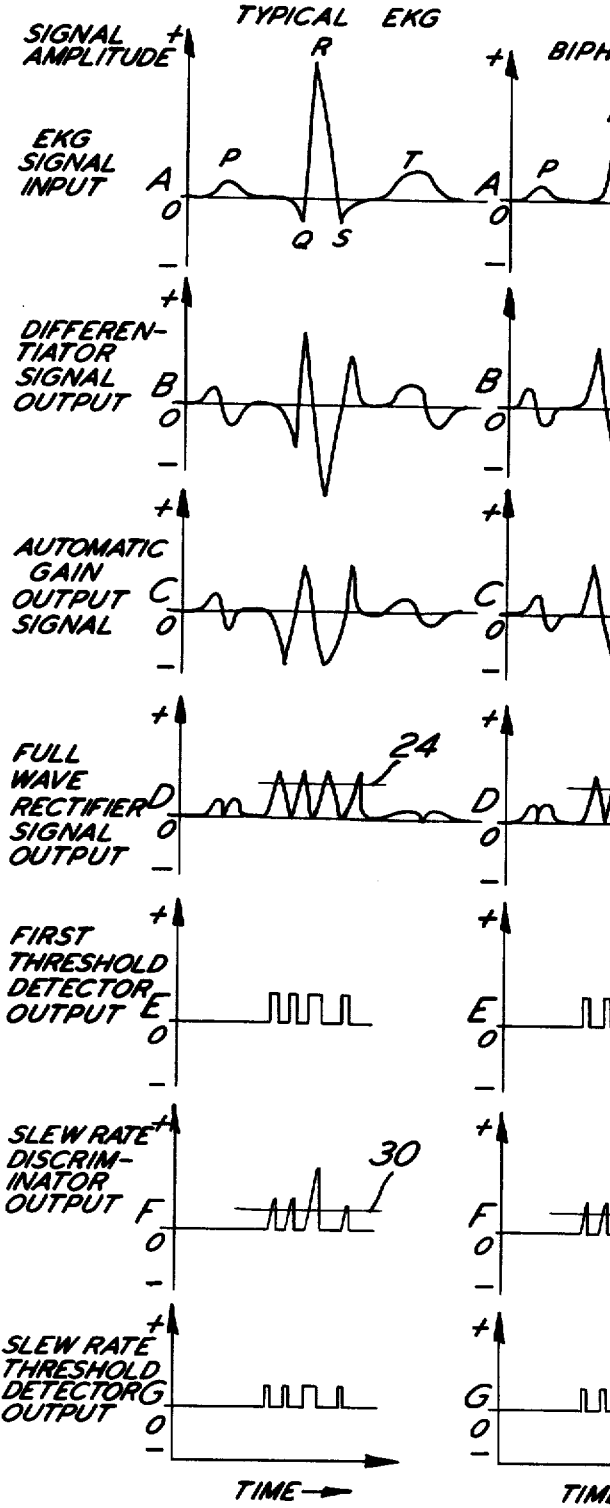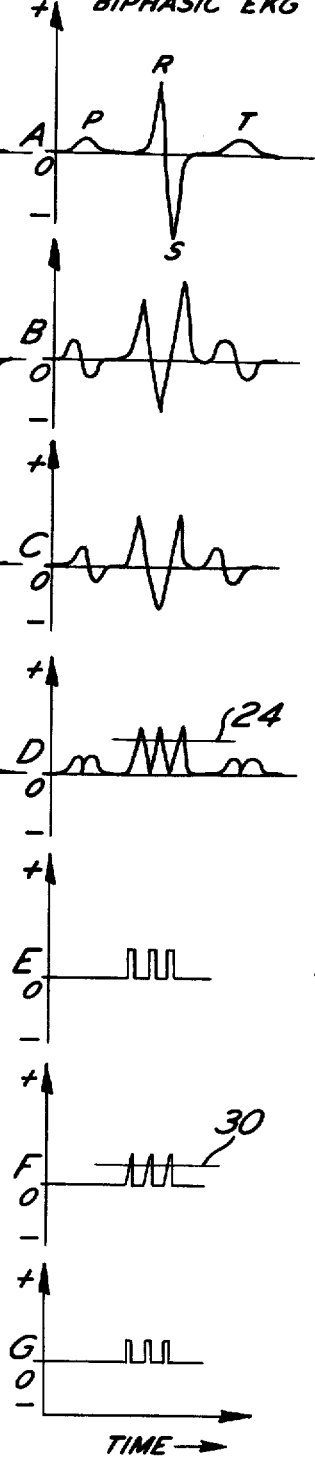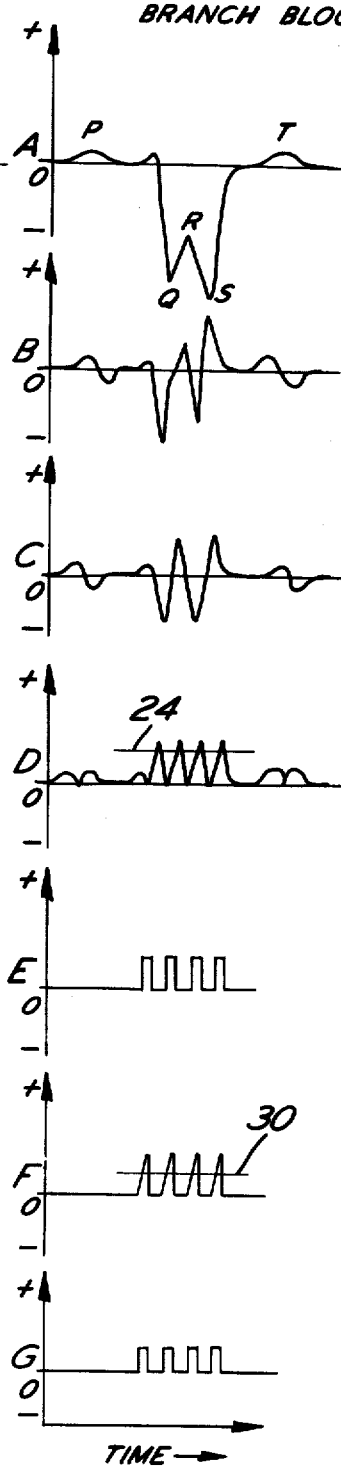

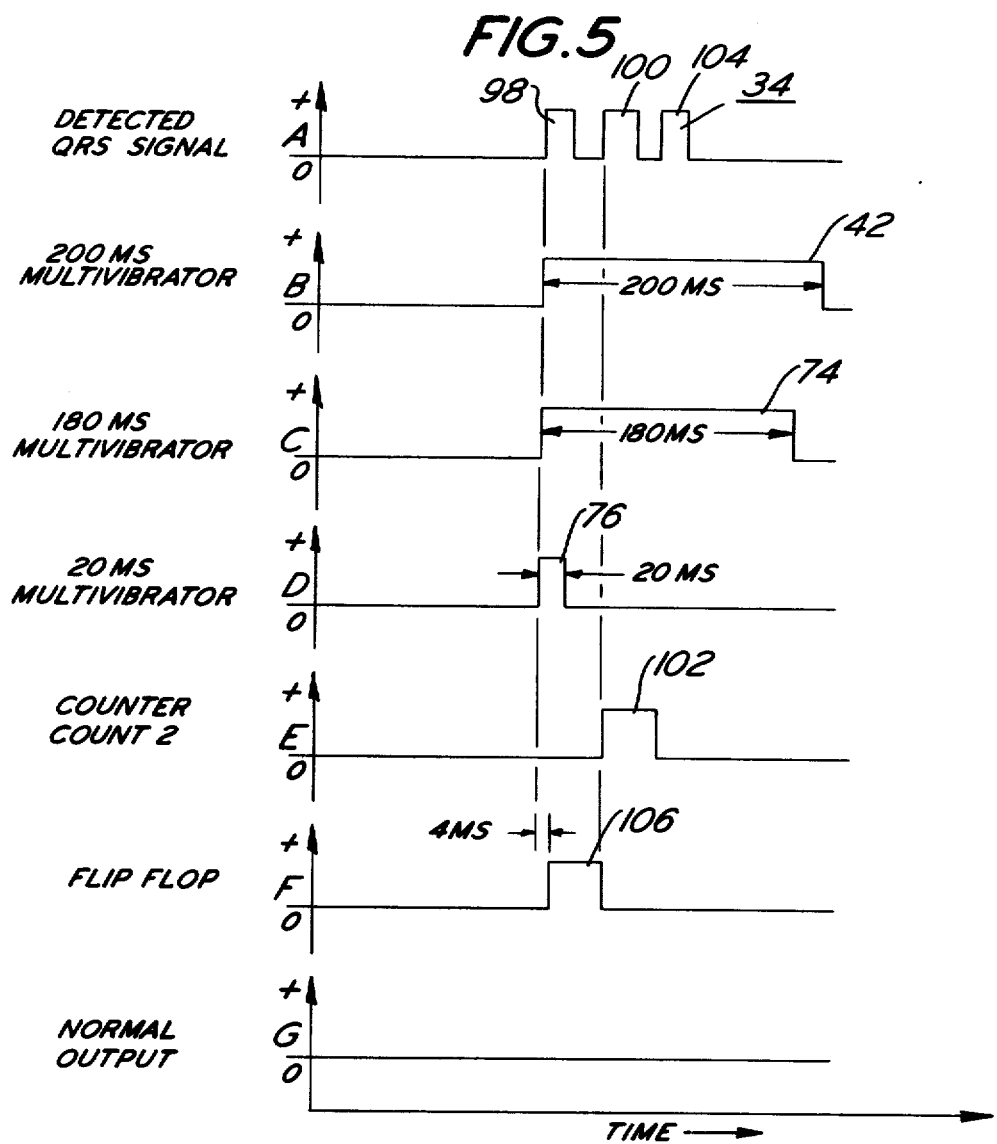
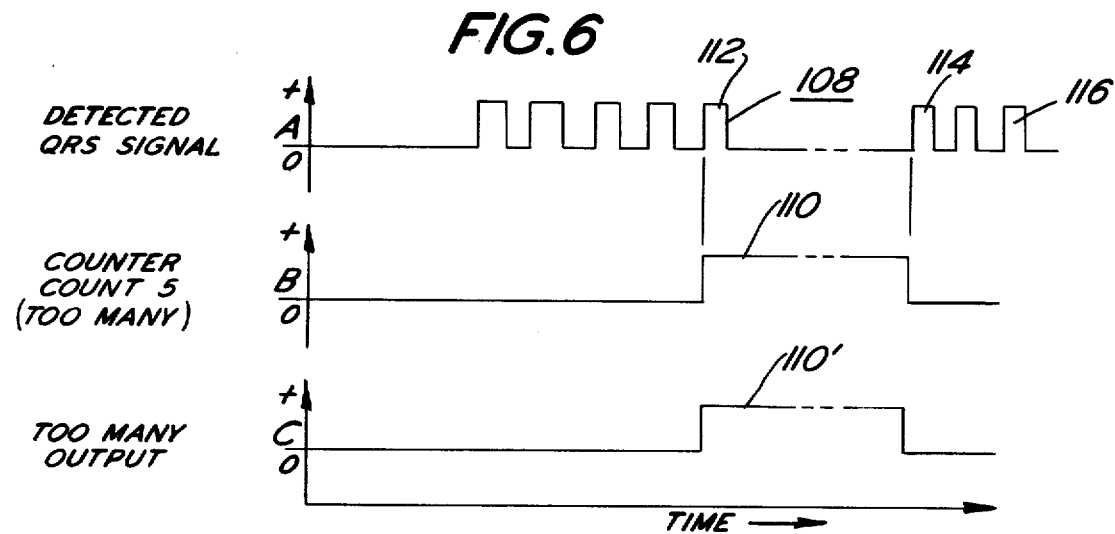

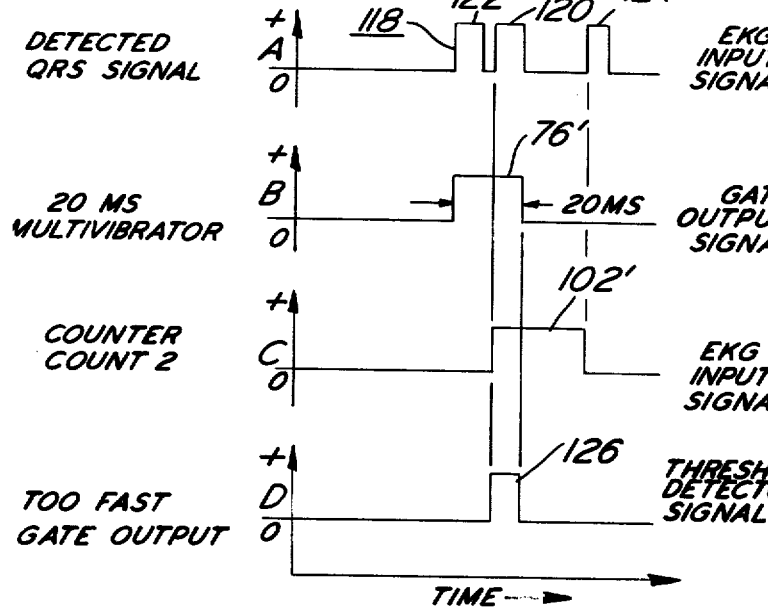
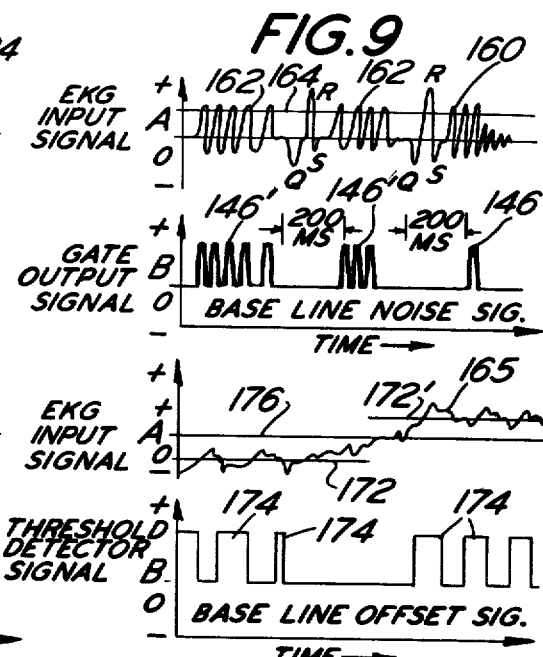
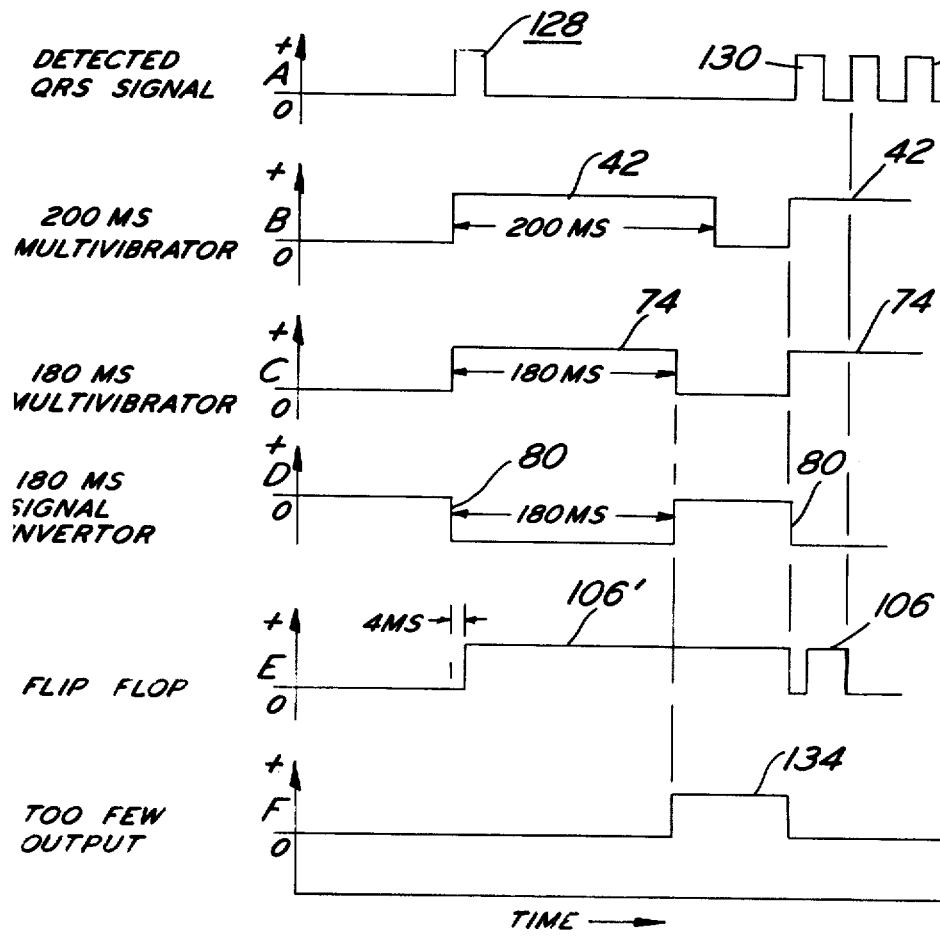

CARDIOGRAPHIC SIGNAL PROCESSING MEANS AND METHOD

The invention relates to a cardiographic signal processing means and method, and more particularly to a means and method for converting a cardiographic analogue information signal to a series of pulse signals and determining from their number and timing whether such signals are of true cardiological origin.

Heretofore, apparatus and methods have been provided for analyzing, measuring and detecting cardiographic signals for determining pathological conditions of the cardiovascular system. However, such devices and methods are subject to erroneous indications and results due to their failure to discriminate between and discard signals present in the body of the subject or otherwise generated which are not of cardiological origin. The present invention provides an apparatus and means for the detection of the QRS wave complex of a cardiographic or EKG signal and also a means for discriminating and removing from consideration such signals which include artifacts and noise signals which are not of cardiographical origin and which would result in providing in improper indications relating to the pure cardiographic signal.

It is therefore a principal object of the invention to provide a new and improved cardiographic signal processing means and method minimizing the delivery of misinformation relating to the condition of a subject from which the cardiographic signal is derived.

Another object of the invention is to provide a means and method for processing cardiographic information signals by reducing same to digital form.

Another object of the invention is to provide a cardiographic signal processing means and method for reducing an analogue information cardiac signal to digital form and determining whether the resulting digital signal conforms in number and timing with that which could be of cardiographic origin.

Another object of the invention is to provide a new and improved cardiographic signal processing means and method which detects and indicates the existence of base line noise in a cardiographic signal.

Another object of the invention is to provide a new and improved cardiographic signal processing means and method which determines base line offset of the cardiographic signals, such as may be due to electrode contact resistance variations, amplifier saturation, or overloading and other such causes.

Another object of the invention is to provide a new and improved cardiographic signal processing means and method which is highly reliable in operation and which is useful as a preprocessor of cardiographic signals for minimizing derivation of false or improper cardiographic information.

The above objects, as well as many other objects of the invention, are achieved by providing a cardiographic or EKG signal processing means comprising first means having an input for receiving a cardiographic information signal and delivering an output signal related to the differential of the input signal, and second means receiving the output signal from the first means and delivering an output pulse signal for each input signal exceeding a predetermined amplitude, whereby the processing means receives an amplitude varying cardiographic input signal and responsively produces a digital signal having one or more related pulses.

The first means includes a low pass filter receiving input signals and delivering output signals to a differentiator for providing the output signal. The output signal is received by an automatic gain control circuit which delivers output signals to the second means, and has a delay characteristic such that the amplifier gain is reduced a predetermined time after receiving the QRS wave complex of an EKG signal for diminishing the amplitude of the following T wave signal, while providing sufficient amplification thereafter of premature ventricular contraction signals occurring soon after the T wave of the cardiographic signal.

The second means includes a full wave rectifier followed by a threshold detector for delivering constant amplitude output pulse signals only for the time interval during which the input signal exceeds the predetermined amplitude. The output signals from the first threshold detector are received by a signal discriminator which delivers output pulse signals only for input pulse signals with a duration exceeding a predetermined time interval, thus eliminating short duration spike signals. This is achieved by a slew rate discriminator which integrates input signal pulses followed by a slew rate threshold detector which delivers output signals for signals having an amplitude exceeding said predetermined value, the duration of the output signals being directly related to the duration of their corresponding input signals.

A third means of the signal processing means delivers an indication signal responsive to receiving more than a predetermined number of pulse signals of an output signal from the second means during a predetermined period, fewer than a predetermined number of pulse signals during a predetermined period, and when the rate of occurrence of such pulse signals of an output signal from the second means exceeds a predetermined rate, for indicating that the derived pulse signals do not correspond to a true cardiographic signal, but are to be considered artifacts.

A means is also provided for producing an output signal indicating base line noise in the cardiographic or EKG signal and includes a fourth detecting means having an input for receiving the cardiographic information or EKG signals and delivering output signals for signals exceeding a predetermined amplitude which is followed by a fifth means receiving the output signals of the second means and delivering an output signal having a duration which is at least as long as the duration of the output signals from the first means, and a gate circuit receiving the respective output signals from the fourth and fifth means and delivering the output signals from the fourth means in the absence of an output signal from the fifth means. Thus, the gate delivers output signals for signals received at the input of the first means having an amplitude exceeding a predetermined amplitude except during the time of delivery of an output signal by the second means, thereby indicating noise of a predetermined amplitude preceding and/or following the occurrence of the digital output signals from the second means.

Means are also provided for indicating base line offset in the received cardiographic or EKG signal which may be due to variations in electrode contact resistance or poor electrode contact with the subject from which the cardiographic signal is being derived, or amplifier saturation or overloading, or the presence of signal drift due to other causes which result in or may cause distortion of the cardiographic information signal. The presence of such base line offset is detected by passing the cardiographic information signal through a 2 Hz low pass filter after which it is rectified by a full wave absolute value rectifier and then received by a threshold detector which has a threshold detecting level above the maximum amplitude of the cardiographic information signals to be received and processed. The occurrence of signals above the threshold level results in the delivery of an output signal indicating that the input signal has a base line offset which can result in producing misinformation and should be treated accordingly.

The method of processing cardiographic or EKG signals in accordance with the invention comprises the steps of receiving cardiographic analogue information or EKG signal, deriving a differential signal of the analogue signal, and providing an output pulse signal during each time the differential signal exceeds a predetermined amplitude, whereby a cardiograph analogue signal is converted to one or more pulses for corresponding with the QRS wave complex of a cardiographic signal. An artifacts indicating signal is provided when the output pulse signals provided for a received signal are fewer than a first predetermined number or greater than a second higher predetermined number and also when the rate of occurrence of one pulse with respect to the next pulse exceeds a predetermined pulse rate.

The method also provides for producing an output pulse signal during each time that the received cardiographic signal exceeds a predetermined amplitude and delivers a base line noise indicating signal upon the occurrence of an output pulse signal at any time other than during the time interval of occurrence of output pulse signals corresponding to the QRS wave complex of the cardiographic signal.

The method provides for detecting a base line offset in the cardiographic or EKG signal by the steps of receiving a cardiographic analogue information signal, eliminating all frequency components of the signal except for low frequency components (2 Hz), rectifying the low frequency components of the cardiographic signal, detecting the amplitude of the rectified signal for amplitudes exceeding a predetermined value, and delivering an output indicator signal for the occurrence of signal having an amplitude exceeding the predetermined value for indicating base line offset for the received cardiographic analogue information signal.

The foregoing and other objects of the invention will become more apparent as the following detailed description of the invention is read in conjunction with the drawing, in which:

FIG. 1 is a block diagram illustrating the cardiographic signal processing means and method of the invention, FIGS. 2–4 are graphic representations of respective cardiographic or EKG signals and the changes in the respective signals produced during their processing by the apparatus of FIG. 1, FIG. 5 is a timing diagram graphically illustrating the operation of the apparatus of FIG. 1 upon delivery of a normal output signal, FIG. 6 is a timing diagram graphically illustrating the operation of the apparatus of FIG. 1 upon providing a QRS pattern artifacts output signal due to the delivery of too many output pulses for the corresponding input cardiographic signal, FIG. 7 is a timing diagram graphically illustrating the operation of the apparatus of FIG. 1 upon providing a QRS pattern artifacts output signal due to the delivery of output pulses exceeding a predetermined repetition rate for the corresponding cardiographic input signal, FIG. 8 is a timing diagram graphically illustrating the operation of the apparatus of FIG. 1 upon providing a QRS pattern artifacts output signal due to the delivery of too few output signals for the corresponding input cardiographic information signal, In FIG. 9, line A is a graphic representation of a cardiographic information input signal to the apparatus of FIG. 1, containing base line noise while line B graphically illustrates the corresponding base line noise signal provided in response by the apparatus of FIG. 1, and In FIG. 10, line A is a graphic representation of a cardiographic information input signal to the apparatus of FIG. 1 having a base line offset, while line B graphically illustrates the output signal provided by the apparatus of FIG. 1, responsive to the input signal.

Like reference numerals designate like parts throughout the several figures.

Refer to FIG. 1 which is a block diagram of a cardiographic or EKG signal processing means 10 embodying the invention and carrying out the method of the invention. A cardiographic signal such as derived by electrocardiogram and known as an EKG signal is derived from a subject in the well known manner by the placement of a plurality of electrodes at selected locations to provide a cyclical cardiographic signal such as those graphically illustrated in FIGS. 2–4, lines A. Such derived EKG signals may include in addition to the cardiographic signal other signal variations or components due to sources other than the cardiovascular system. Such signal components which may be produced by muscular movement of the subject, variations in the contact resistance of the electrodes deriving the signal, provide artifacts which may result in producing false indications by a cardiographic processing apparatus, unless such artifacts and noise signals are recognized as distinct from the signals of cardiographic origin. A difficulty is also encountered in the malfunction of amplifying and other processing equipment utilized in deriving the EKG signal resulting in distortion of the EKG signal presented for processing and analysis. Such distortion can be produced by long term drift effects, the saturation or overloading of amplifiers, change in electrode placement, bias effects, or misadjustment of apparatus. Such effects result in excursions of the base line of the EKG signal resulting in distortions referred to herein as base line offset of the EKG signal.

The apparatus and the method of the invention utilize EKG signals derived from a subject and processes such received cardiographic analogue information signals to produce output pulses or digital signals having a number, spacing and width corresponding to the QRS wave complex of the input EKG signal. From a consideration of typical EKG signals and EKG signals of pathological origin, such signals have been found to produce by means of the invention between two to four output pulse signals corresponding to an input EKG signal. The production of any other number below or above such range has been found to provide an indication that the input signal contains artifacts or noise signals and should be treated accordingly by being eliminated from further consideration or distinguished from other input signals. Such output signals are designated QRS pattern artifact signals.

The EKG input signal which is delivered to line 12 is received by a 40 Hz low pass filter 14, which operates to remove undesirable high frequency signals delivered with an EKG signal and provides the output signal to a differentiator 16 of the type provided with a double roll off. Such a differentiator preferably has a design gain-frequency characteristic of plus 6 db per octave between 0 Hz and 30 Hz and a design gain-frequency characteristic of minus 6 db per octave over 30 Hz. FIGS. 2–4, lines B, illustrate the resulting differential signal output provided by the differentiator 16 corresponding respectively to the typical EKG signal of FIG. 2, line A, the biphasic EKG signal of FIG. 3, line A, and the EKG signal with bundle branch block of FIG. 4, line A.

The signal from the differentiator 16 is delivered to a two stage automatic gain circuit 18. The automatic gain circuit 18 is preferably of the type providing a time constant characteristic such that the amplifier gain is reduced a predetermined time after receiving a QRS wave complex signal for diminishing the amplitude of the following T signal, while providing sufficient amplification thereafter of premature ventricular contraction signals occurring soon after the T wave of the EKG signal. Such an amplifier is described in the Fairchild Semiconductor Application Note 243 of January, 1971, page 3, FIGS. 9, 10 and the following, relating to simple and advanced compressor amplifiers. The resulting output signals are illustrated in FIGs. 2–4, lines C.

The signal delivered by the automatic gain control circuit 18 is then received and rectified by the full wave rectifier 20 as illustrated by FIGS. 2–4, lines D. With regard to FIGS. 2–4, lines D, it is noted that the predominant peaks of the illustrated signals are produced by the QRS wave complex of their respective EKG signals, while the P and T components result only in small amplitude variations in the output signal. This result is achieved by differentiating the input signals as illustrated in FIGS. 2–4, lines B which provides signal peaks corresponding to the faster rise times associated with the Q, R, and S wave complex of the input signal.

The signals from the rectifier 20 are received by the first threshold detector 22 which has a threshold level illustrated by the horizontal line 24 in FIGS. 2–4, lines D. The detector 22, delivers an output pulse signal of predetermined amplitude having a duration corresponding to the time during which the input signal amplitude exceeds the predetermined level 24. Thus for the input signal of FIG. 2, line D, the detector 22 provides an output signal shown in FIG. 2, line E comprising four pulses of varying width and spacing from one another. Correspondingly, the signal of FIG. 3, line D provides an output signal of three pulses, while the input signal of FIG. 4, line D provides an output signal of four pulses illustrated respectively in FIGS. 3 and 4, line E.

The output pulse signals from the detector 22 are delivered to a slew rate discriminator 26 which acts to integrate each input pulse signal as illustrated in FIGS. 2–4 lines F. By this action, signals of longer duration result in output signals having a greater peak amplitude. The signals from the discriminator 26 are delivered to a slew rate threshold detector 28, which acts to deliver a pulse signal of constant amplitude during the time that the input signal exceeds a predetermined amplitude level such as that illustrated by the horizontal line 30 in FIGS. 2–4 lines F.

The output signal of the slew rate threshold detector 28 is delivered to the output line 32 and comprises a plurality of output pulses of constant amplitude corresponding in spacing and duration to the input signal derived from the discriminator 26. In comparing the output signals of FIGS. 2–4, lines G respectively, with the signals of FIGS. 2–4, lines E, it is noted that the signals are substantially identical in form including duration and spacing. The discriminator 26 and detector 28 are provided for the purpose of eliminating short duration high amplitude signals or spikes which may have been present in the output signal from the first threshold detector 22, which spike signals are undesirable in the digital output signal corresponding to the input EKG signal.

Considering the output signals delivered to line 32, it is noted that a series of pulses relate to and characterize the QRS wave complex of each of the input EKG signals, and are designated herein as the detected QRS signal. The output detected QRS signal from the detector 28, such as for example the signal 34, (see FIG. 5, line A) which may comprise any number of pulses, is delivered over line 36 to the input of a 200 millisecond one shot multivibrator 40 of a pattern artifact detection circuit 39. Upon receiving the first pulse of the signal 34, the multivibrator 40 generates an output pulse signal 42 of constant amplitude having a duration of 200 milliseconds as illustrated in FIG. 5, line B. The signal 34 is also delivered over a line 44 to the clock input of a digital counter 46 which counts the number of pulses received. The output signal from the multivibrator 40 is delivered to an inverter 48 which provides a negative going signal which upon termination goes positive and acts to clear and reset the counter 46 at the end of the 200 millisecond interval. In this manner, the counter 46 is cleared in preparation for the receipt of the next succeeding detected QRS signal over the lines 36 and 44.

The output pulse 42 from the multivibrator 40 is also delivered to a differentiator circuit 52 comprising a series capacitor followed by a grounded resistor which produces a pulse signal 54 for the leading edge of the signal 42, while the diode 56 which is returned to the ground in parallel with the resistor of the circuit 52, by-passes the negative going pulse produced by the trailing edge of the pulse 42. The pulse 54 is delivered to the input of an inverter amplifier 56 which delivers a negative going pulse 57 to a second differentiator circuit 58 comprising a series capacitor followed by a grounded resistor. In this case, a positive going pulse 60 is produced for the trailing edge of the inverted signal 57, while the negative going pulse produced by the leading edge is bypassed by a grounded diode 62. The pulse 60, thus is delayed with respect to the leading edge of the pulse 57, which delay may be in the order of 4 milliseconds. The pulse 60 is received by a flip-flop circuit 64 placing it in its set condition. The flip-flop 64 remains in its set condition until the counter 46 reaches the count of 2, at which time an output signal is delivered over the line 66 to the flip-flop circuit 64, placing it in its reset state.

The positive going pulse 54 which is delivered to the inverter 56 is also delivered over a line 68 to the input of a 180 millisecond one shot multivibrator 70 and the input of a 20 millisecond one shot multivibrator 72. The multivibrator 70 upon receiving the input pulse 54 delivers a constant amplitude output pulse signal 74 having a duration of 180 milliseconds, while the multivibrator 72 upon receiving the input pulse 54 delivers a constant amplitude output pulse signal 76 with a duration of 20 milliseconds, as respectively illustrated in FIGS. 5C and 5D.

The output signal 74 from the multivibrator 70 is delivered to the input of an inverter 78 which delivers an inverted output signal 80 having a duration of 180 milliseconds to an input of a gate 82. Another input to the gate 82 is provided over line 84 from the output of the flip-flop circuit 64. The output signal from the gate 82 is delivered over line 86 to a buffer circuit 88 which has an output line 90 delivering a signal for indicating the presence of QRS pattern artifacts.

The output signal from the multivibrator 72 is also delivered to the input of a gate 92 which receives at another input, the output signal from the counter 46 over the line 66 when the counter 46 is in its count 2 condition. The gate 92 also delivers over its output line 94 a signal to the input of the buffer circuit 88 for delivery over its output line 90.

The buffer circuit 88 also receives a third input over a line 96 from the counter 46 when the counter reaches the count of five and during the time that the counter remains in the count 5 state. The signal delivered over the line 96 is also transmitted by the buffer circuit 88 to the output line 90.

In operation, when the EKG input signal to the processing means 10 provides a detected QRS signal output on the line 32, comprising 2 to 4 pulses occurring at a pulse rate measured from one pulse to the next occurring pulse which does not exceed a predetermined value, the detected QRS signal is considered to be derived from and representative of the cardiovascular system. Under such circumstances the lines 86, 96 and 94 do not deliver to the line 90 an output signal, and such condition is illustrated as a normal output in FIG. 5.

For an explanation in greater detail consider FIG. 5, in which line A represents a detected QRS signal 34 having three pulses. However, any of the pulse signals such as those shown in FIGS. 2-4, lines G may also be delivered over the line 32 for the purpose of this example. Upon occurrence of the first pulse 98 of the signal 34, the 200 millisecond signal 42 is generated by the multivibrator 40, as illustrated in FIG. 5, line B. The initiation of the pulse 42 triggers the miltivibrators 70 and 72 to produce the pulse signals 74 and 76 illustrated in FIGS. 5, lines C and D. The occurrence of the second pulse 100 of signal 34 results in the delivery by the counter 46 of an output signal 102 shown in FIG. 5, line E during the time when the counter 46 is in its count 2 condition. The occurrence of the third pulse 104 of the signal 34, results in the termination of the count 2 signal 102. The output pulse signal 106 from the flip-flop circuit 64 shown in FIG. 5, line F is produced by the occurrence of the output signal 42 from the multivibrator 40 after a delay of approximately 4 milliseconds. The delay is the result of deriving the set pulse for the flip-flop circuit 64 by differentiation of the trailing edge of the inverted signal 57. The signal 106 is terminated upon the occurrence of the count 2 signal 102 shown in FIG. 5, line E.

The delivery of the output signal on line 84 from the flip-flop 64 is delayed by differentiating the trailing edge of the pulse 57, to provide the delayed pulse 60. This allows the application to the gate 82 of the inhibiting signal 80 derived from the multivibrator 70 prior to the delivery of the positive signal 106 from the flip-flop circuit 64. This avoids the delivery of a false output signal when the initial pulse of a detected QRS signal is delivered to the pattern artifact detecting circuit 39. Since a positive going signal to the gate 82 from the inverter 78 is provided only after the termination of the 180 millisecond pulse 74, and the positive going signal 106 from the flip-flop circuit 64 is not present after the termination of the 180 millisecond signal 74, the gate 82 does not deliver an output signal. Similarly, since the positive going signal 76 shown in FIG. 5, line D is no longer present by the time that the counter 46 provides the count 2 signal 102 shown in FIG. 5, line E, the absence of the delivery of concurrent positive signals to the gate 92, results in the absence of an output signal over line 94 for delivery to the line 90 through the buffer circuit 88. Since the detected QRS signal 34 does not contain 5 pulses, the counter 46 also fails to deliver an output signal to the buffer 88 for delivery to the output line 90. Thus as shown in FIG. 5, line G, the line 90 does not deliver an output pulse signal but provides a level signal constituting the normal output for indicating the absence of QRS pattern artifacts.

Referring to FIG. 6, a detected QRS signal 108 comprising 5 pulses is illustrated in line A. Since the number of pulses exceeds 4 pulses which are considered to be the maximum number representative of an electrocardiogram signal from a subject, the processing means 10, in this case, acts to indicate that the signal received is a QRS pattern artifact. This results when the counter 46 receives the fifth pulse 112 of the signal 108 and upon reaching the count 5 delivers the output signal 110. The output signal 110 shown in FIG. 6, line B, is delivered over the line 96 and through the buffer circuit 88 to the output line 90, as signal 110' shown in FIG. 6, line C. The signals 110 and 110' are terminated upon the resetting of the counter 46 with the occurrence of the first pulse 114 of a succeeding detected QRS signal 116. The signals 110 and 110' will also be terminated upon receiving the sixth pulse of a detected QRS signal having more than 5 pulses, at which time the counter terminates the delivery of the count 5 signal over the line 96. Nevertheless, an output signal is delivered to the output line 90 upon the occurrence of more than 4 pulses in a detected QRS signal indicating that the detected signal is a pattern artifact signal, that is, a signal not meeting the criteria as to number and frequency for determining that EKG signals derived from a subject are representative of cardiological origin.

FIG. 7 represents the situation occurring when the EKG input signal provides a detected QRS signal over line 32 having pulses which occur at a frequency rate which is greater than the frequency rate determined to be representative of an EKG signal from a subject. From consideration of the frequency rates to be expected, it has been determined that a detected QRS signal of an EKG signal which has a rate of occurrence between next succeeding pulses providing a delay of less than 20 milliseconds is not representative of an EKG signal from a subject and is the result of artifacts. The detected QRS signal 118 illustrated in FIG. 7, line A comprises 3 pulses with the second pulse following shortly after the first pulse 122 and being spaced in time from the last pulse 124. With the occurrence of the first pulse 122 of the signal 118, the multivibrator 72 is triggered resulting in the output of the signal 76' having a duration of 20 milliseconds illustrated in FIG. 7, line B. Since the second pulse 120 occurrs within 20 milliseconds from the occurrence of the first pulse 122 of the signal 118, the count 2 signal 102' provided by the counter 46 and illustrated in FIG. 7, line C, is produced concurrently with the signal 76'. With the delivery of concurrent signals to the gate 92, an output signal 126 is delivered over line 94 which is passed by the buffer circuit 88 to the output line 90 as illustrated in FIG. 7, line D. The output signal 126, delivered to the output line 90, indicates the presence of a QRS pattern artifact. In this case, the output signal is provided by repetition rate or frequency of adjacent pulses being greater than the predetermined frequency rate.

Refer to FIG. 8 which relates to a situation occurring when the detected QRS signal 128 shown in line A, constitutes a single pulse. Under such circumstance, the signal 128 is recognized as having too few pulses and therefore constituting a signal which is not representative of an EKG signal derived from a subject. As before upon the occurrence of the pulse of signal 128, the multivibrator 40 generates the output signal 42 shown in FIG. 8, line B, while the multivibrator 70 provides the output signal 74 shown in FIG. 8, line C. The 180 millisecond signal from the multivibrator 70 is inverted by the inverter 78 to provide the negative going signal 80 illustrated in FIG. 8, line D. The flip-flop circuit 64 generates an output pulse 106' which is slightly delayed with respect to signal 42 from the multivibrator 40 as previously explained in connection with FIG. 5, line F, and is shown in FIG. 8, line E. The signal 106' is delivered over line 84 until such time that that the flip-flop circuit 64 is reset by the first pulse 130 of a succeeding detected QRS signal 132, as illustrated in FIG. 8, line A. Since the flip-flop circuit 64 is not reset by receipt of an output signal from the counter 46 due to the absence of a second pulse in the signal 128, concurrent positive input signals are delivered to the gate 82 upon the termination of the negative going 180 millisecond output signal from the multivibrator 70. This results in an output signal 134 from the gate 82 which is illustrated in FIG. 8, line F, which signal is delivered through the buffer 88 to the output line 90 indicating the presence of a QRS pattern artifact. In this case the output signal on line 90 results from the occurrence of less than 2 pulses in the detected QRS signal 128, so that by the established criterion, the received EKG input signal is determined not to be representative of a signal of cardiological origin from a subject.

In summary, a QRS pattern artifacts signals are delivered on the output line 90, when the input signal on line 12 is such that the detected QRS signal delivered to line 32 comprises less than 2 pulses or more than 4 pulses, or when the rate of occurrence of adjacent pulses in the QRS signal is equal to or less than 20 milliseconds from the time of initiation of one pulse to the initiation of the next succeeding pulse. The occurrence of a QRS pattern artifact signal on line 90 indicates that the input signal on line 12 is not truly representative of a cardiologically derived signal from a subject and should not be treated or evaluated as such. This is of importance, since this information will avoid analysis of or an indication from such signal that an emergency situation is or has occurred, thus avoiding false alarms and indications. The avoidance of such false indications or analysis, of course, provides a cardiographic signal processing means and methods which is more reliable and efficient, increasing the ability of same to provide indications of true emergency situations and to make accurate analysis and determinations from the information signals received.

In addition to receiving input signals on line 12 which are not representative of EKG signals from a subject and resulting in the delivery of QRS pattern artifact signals on the output line 90, interference due to base line noise will also effect EKG input signals so that false and inaccurate information may result therefrom. In order to minimize and avoid false and inaccurate evaluations, the processing means 10 and method of the invention also provide for the delivery of the EKG input signal on line 12 to a base line noise detecting circuit 136.

The circuit 136 has a band pass filter 138 which receives EKG input signals delivered to line 12. The band pass filter 138 has a center frequency of 40 Hertz, passing signal frequencies caused by muscle artifacts and other noise signals which are not normally present in an EKG signal derived from a subject. The signals from the band pass filter 138 are delivered to the input of a threshhold detector 140 which delivers an output pulse signal 142 during the time each input signal has an amplitude greater than a predetermined value, the output pulses being of constant amplitude. The detector signals 142 are received by the input of a differentiator 144 which delivers an output pulse for each of the trailing edges of the input pulse signals 142, thus resulting in corresponding delayed pulses providing the output signal 146. The signals 146 are delivered to an input of a gate 148.

The base line noise detecting circuit 136 is also provided with a 200 millisecond one shot multivibrator 150 which may be identical to the multivibrator 40. The multivibrator 150 receives detected QRS signals over line 32. The output signal 152 from the multivibrator 150 having a duration of 200 milliseconds, is received by an inverter 154 which delivers an inverted output signal 156. The signal 156 is delivered to the other input of the gate 148. Upon the concurrence of positive pulse signals 146 from the differentiator 144 and a positive going signal from the inverter 154 upon the termination of the signal 156, the gate 148 delivers the pulse signals 146' shown in FIG. 9, line B to the output line 158. Such signals 146' on the line 158 serve to indicate the presence of base line noise in the input signal on line 12. With the information that base line noise is present in the input signal, the input signal may be treated to avoid obtaining misinformation or false alarms thereby further increasing the reliability and accuracy of any signal processing means used for evaluation and alarm indications.

Referring to FIG. 9 for an illustration of the operation of base line noise circuit 138, line A illustrates an input EKG signal 160 providing the QRS wave complex and signals 162 comprising base line noise which is not part of the desired EKG signal. Such noise signals 162, as evident from the illustration, may result in false indications to the position, location and number of the wave components of an electrocardiographic signal, which may result in false information and analysis.

In the operation of the base line noise detecting circuit 136, after the selected frequency wave components have been passed by the filter 138, the threshold detector 140 provides an output signal for the occurrence of an amplitude in the input signal 160 which exceeds the predetermined level of the horizontal line 164 in FIG. 9, line A. After the signals 142 from the detector 140 are differentiated by the trailing edge differentiator 144 which results in a delay in each of the output pulses of the signal 146, the signals are delivered to one of the inputs of the gate 148. However, during the occurrence of the 200 millisecond interval beginning with the occurrence of the first pulse of the detected QRS signal over line 32 the multivibrator 150 delivers an output signal which is inverted by the inverter 150 to provide an inhibiting signal to the gate 148, in the form of a negative going signal. Thus during a period of 200 milliseconds, during which the QRS wave complex occurs, and the detected QRS signal is generated and delivered to the line 32, no output signals are delivered to the line 158. However, the occurrence of signals with an amplitude greater than the predetermined value 164 of the detector 140 results in the generation of output pulse signals 146 which in the absence of the negative going signal 156 are delivered over the output line 158 and are illustrated as the pulse signals 146' in FIG. 9, line B. The pulse signals 146 are delayed by the differentiator 144 so that the output inhibiting signal derived from the multivibrator 150 upon the occurrence of the first pulse of the detected QRS signal line 32 is delivered to the gate 148 prior to the delivery of the differentiated signal corresponding to the QRS wave complex signal received by the differentiator 144. This avoids an indication of a noise signal due to the occurrence of a detected QRS signal.

A base line offset indicating circuit 163 is also provided by the signal processing means 10 for the purpose of indicating a deficiency in the EKG input signal received on line 12. Such a deficiency may be due to variation or change in the placement of the electrodes of the EKG detecting apparatus, delivery of high or low amplitude signals, the saturation or overloading of amplifiers or other processing apparatus and other long term effects which result in providing input signals which are not properly representative of the cardiographic condition of the subject. Such signals, are graphically illustrated in FIG. 10A by the input signal 165 which drifts above and below the zero base line 176.

The input signal from the line 12 is delivered to a low pass filter of the circuit 163 which reduces and eliminates signals above 2 Hz and delivers its low frequency output signals to a full wave rectifier 166 providing absolute value fully rectified output signals to the input of a threshold detector 168. The detector 168 delivers an output signal of constant amplitude during the presence of an input signal which exceeds a predetermined amplitude. The output pulse signals are delivered to an output line 170 and provides an indication of the presence of a base line offset condition for the EKG input signal. Since a base line offset condition results in an input signal which may provide false information and alarm signals unless appropriately treated, the delivery of the base line offset indicating signal by the circuit 163 serves to also increase the reliability and usefulness of the signal processing means 10 and method of the invention.

Refer particularly to FIG. 10 for a graphic illustration of the operation of the base line offset indicating circuit 163. The EKG input signal 165 in FIG. 10, line A illustrates a drift or variation of the signal from the base line, which is to be detected by the base line offset indicating circuit 163. The low pass filter 164 eliminates high frequency variations, such as the peak variations of the QRS wave complex, and allows only the lower frequency changes of 2 Hz or less to be received by the full wave rectifier 166. With the rectification of the input signal 165, the horizontal lines 172 and 172' serve to indicate the predetermined amplitude level of the threshold detector 168 resulting in the delivery of output signals during the times when the input signal exceeds an absolute value, either above or below the zero base line 176 of the FIG. 10, line A. The generated output pulse signals 174, which indicate the presence of the base line offset condition each have a duration co-extensive with the time during which the input signal exceeds the predetermined threshold value and a constant amplitude as illustrated in FIG. 10, line B.

The cardiographic signal processing means and method described herein disclose a means and method for converting the cardiographic analogue signal derived from a subject to digital or pulse form. The resulting digital signal comprises one or more pulses which vary in time duration, spacing and rate of occurrence from one pulse to the next succeeding pulse. Such pulse signals may be further analyzed for providing information with regard to the received cardiographic analogue signal. The invention provides means and method whereby the information in digital form is treated for determining whether or not the received cardiographic analogue signal is representative of the cardiovascular system of the subject. The invention determines the presence of artifacts, noise signals and/or other defects in the analogue signal resulting from improper placement of electrodes or malfunctioning of processing equipment. The cardiographic signal processing means and method, thus, provide an efficient and effective means for increasing the reliability of cardiographic processing apparatus, minimizing errors in the processing of information containing artifacts, noise signals and other defects and thus increasing the reliability of information provided, including analytical data and alarm signals relating to the condition of the subject.

While the invention has been described and illustrated with reference to a specific embodiment, it is understood that the invention is capable of various modifications and applications, not departing essentially from the spirit thereof, which will become apparent to those skilled in the art.

What is claimed is:

1. Cardiographic signal processing means comprising first means having an input for receiving an amplitude varying cardiographic information signal including QRS wave complex signal and delivering an output signal related to the differential of the input signal, an automatic gain control circuit receiving output signals from said first means and delivering output signals, said control circuit having a delay characteristic such that the gain is reduced a predetermined time after receiving a QRS wave complex signal for diminishing the amplitude of the following T wave signal, while providing sufficient amplification thereafter of premature ventricular contraction signals occurring soon after the T wave signal of said cardiographic signal, second means receiving the output signal from said automatic gain control circuit and delivering an output pulse signal for each input signal exceeding the predetermined amplitude, whereby an amplitude varying input signal is reduced to digital form with one or more spaced pulse signals for each QRS wave complex signal of the received information signal, and third indicating means receiving the output pulse signals of said second means and delivering an output signal for each QRS wave complex signal of the received information signal responsive to the number and spacing of the received output pulses for each QRS wave complex signal and which output signal indicates whether the received information signal is not of pure cardiological origin.

2. The means of claim 1 in which the second means includes a threshold detector for delivering constant amplitude output pulse signals only for the time interval during which the input signal exceeds said predetermined amplitude.

3. The means of claim 2 in which said second means includes a signal rectifier receiving input signals and delivering output signals to the threshold detector.

4. The means of claim 3 in which said signal rectifier of said second means is a full wave rectifier.

5. The means of claim 4 in which said first means includes a low pass filter receiving input signals, and said second means includes a slew rate discriminator integrating input signal pulses from said second means and delivering integrated pulse signals, and a slew rate threshold detector receiving the pulse signals from said slew rate discriminator and delivering output pulse signals for received signals which have an amplitude exceeding a predetermined value, whereby the duration of said output signals from said threshold detector are directly related to the duration of their corresponding input signals and are delivered only for input signals with a duration exceeding a predetermined duration.

6. Cardiographic signal processing means comprising first means having an input for receiving a cardiographic information signal including QRS wave complex signals and delivering an output signal related to the differential of the input signal, second means receiving the output signal from said first means and delivering an output pulse signal for each input signal exceeding a predetermined amplitude providing one or more spaced pulse signals corresponding to each QRS wave complex signal of the received information signal, whereby an amplitude varying cardiographic input signal responsively produces an output signal with one or more related pulse signals for each QRS wave complex signal of said information signal, and third indicating means receiving the output pulse signals of said second means and delivering an output signal for each QRS wave complex signal of the received information signal responsive to the number and spacing of the received output pulses for each QRS wave complex signal and which output signal indicates whether the received information signal is not of pure cardiographic origin.

7. The means of claim 6 in which said third means delivers an output signal responsive to receiving more than a predetermined number of pulse signals of an output signal from said second means during a predetermined time period corresponding to the duration of the QRS wave complex signal of the received information signal which output signal indicates the presence of an artifact signal in the received information signal.

8. The means of claim 7 in which said third means delivers an output signal responsive to receiving fewer than a predetermined number of pulse signals of an output signal from said second means during a predetermined time period corresponding to the duration of the QRS wave complex signal of the received information signal which output signal indicates the presence of an artifact signal in the received information signal.

9. The means of claim 6 in which said third means delivers an output signal responsive to receiving fewer than a predetermined number of pulse signals of an output signal from said second means during a predetermined time period corresponding to the duration of the QRS wave complex signal of the received information signal which output signal indicates the presence of an artifact signal in the received information signal.

10. The means of claim 6 in which said third means delivers an output signal responsive to the rate of occurrence of one pulse signal to the next pulse signal of an output signal from said second means corresponding to the duration of the QRS wave complex signal of the received information signal which output signal indicates the presence of an artifact signal in the received information signal.

11. The means of claim 10 in which said third means delivers an output signal when the rate of occurrence of one pulse signal to the next pulse signal of an output signal from said second means corresponding to a QRS wave complex signal of the received information signal exceeds a predetermined rate which output signal indicates the presence of an artifact signal in the received information signal.

12. The means of claim 6 in which said third means delivers respective output signals responsive to receiving more than a predetermined number of pulse signals of an output signal from said second means during a predetermined period corresponding to a QRS wave complex signal of the received information signal, fewer than a predetermined number of said pulse signals during a predetermined period corresponding to a QRS wave complex signal of the information signal, and when the rate of occurrence of one pulse signal to the next pulse signal of such pulse signals of an output signal from said second means corresponding to a QRS wave complex signal exceeds a predetermined rate the delivery of said output signals each indicating the presence of an artifact signal in the received information signal.

13. The means of claim 12 in which said third means includes a pulse counting means receiving and counting the pulse signals of an output signal received from said second means and delivering a first output signal when said count for an output signal corresponding to the QRS wave complex signal of the received information signal is larger than a predetermined first number and a second output signal when said count is less than a predetermined second number, said first number being larger than said second number, means for clearing said counting means including a first pulse signal generator delivering an output signal to said counting means clearing same for each occurrence of a QRS wave complex signal of the received information signal, the output signal of said generator being initiated upon receiving the first pulse signal of an output signal corresponding to a QRS wave complex signal from said second means and having a duration which is at least as long as the duration of the output signal corresponding to the QRS wave complex signal from said second means, a bistable circuit having a set state and a reset state, said bistable circuit being placed in its set state by receiving a signal from said first signal generator and being placed in its reset state upon receiving a second output signal from said counting means, said bistable circuit delivering an output signal when in its set state, a second pulse signal generator receiving an input signal derived from the output signal of said first generator and delivering an output signal of shorter duration than that of an output signal of said first generator, a first gate circuit receiving output signals from said bistable circuit and said second generator and delivering an output signal from said bistable circuit in the absence of an output signal from said second generator, and a second gate circuit receiving at its input the second output signals from said counting means and from said second generator and delivering an output signal upon the concurrence of said input signals, whereby said third means delivers a first output signal from said counting means in response to receiving more than a first predetermined number of pulse signals for an output signal from said second means, delivers an output signal from said first gate circuit in response to receiving fewer than a predetermined number of pulse signals of an output signal from said second means, and delivers an output signal from said second gate circuit in response to the rate of occurrence of pulse signals of an output signal from said second means exceeding a predetermined rate.

14. The means of claim 6 in which said third means includes a pulse counting means receiving and counting the pulse signals of an output signal received from said second means and corresponding to the QRS wave complex signal of the received information signal and delivering an output signal when said count for an output signal during the period corresponding to the QRS wave complex signal exceeds a predetermined number indicating the presence of an artifact signal in the received information signal, and means for clearing said counting means after completing the count for an output signal from said second means corresponding to said QRS wave complex signal of the received information signal, whereby received information signals of pure cardiological origin are distinguished from received information signals including artifact signals.

15. The means of claim 14 in which the means for clearing said counting means includes a pulse signal generator delivering an output signal to the counting means clearing same for each occurrence of a QRS wave complex signal of the received information signal, the output signal of said generator being initiated upon receiving the first pulse signal of an output signal corresponding to a QRS wave complex signal from said second means and having a duration which is at least as long as the duration of the output signals corresponding to a QRS wave complex signal of the received information signal from said second means, whereby said third means delivers an output signal in response to receiving more than a predetermined number of pulse signals for an output signal from said second means during a predetermined time period corresponding to a QRS wave complex signal of the received information signal which output signal indicates the presence of an artifact signal in the received information signal.

16. The means of claim 14 in which the means for clearing said counting means includes a first pulse signal generator delivering an output signal to the counting means clearing same for each occurrence of a QRS wave complex signal of the received information signal, the output signal of said first generator being initiated upon receiving the first pulse signal of an output signal corresponding to a QRS wave complex signal from said second means and having a duration which is at least as long as the duration of the output signal corresponding to the QRS wave complex signal from said first means, and including a bistable circuit having a set state and a reset state, said bistable circuit being placed in its set state by receiving a signal from said first signal generator and being placed in its reset state upon receiving an output signal from said counting means, said bistable circuit delivering an output signal when in its set state, a second pulse signal generator receiving an input signal derived from the output signal of said first generator and delivering an output signal of shorter duration than that of an output signal of said first generator, and a gate circuit receiving output signals from said bistable circuit and said second generator and delivering an output signal from said bistable circuit in the absence of an output signal from said second generator, whereby said third means delivers an output signal in response to receiving fewer than a predetermined number of pulse signals of an output signal from said second means during a predetermined time period corresponding to a QRS wave complex signal of the received information signal which output signal indicates the presence of an artifact signal in the received information signal.

17. The means of claim 14 in which the means for clearing said counting means includes a first pulse signal generator delivering an output signal to the counting means clearing same for each occurrence of a QRS wave complex signal of the received information signal, the output signal of said first generator being initiated upon receiving the first pulse signal of an output signal corresponding to a QRS wave complex signal from said second means and having a duration which is at least as long as the duration of the output signal corresponding to the QRS wave complex signal of the received information signal from said first means, a second pulse signal generator receiving an input signal derived from the output signal of said first generator and delivering an output signal of shorter duration than that of an output signal of said first generator, and a gate circuit receiving at its input the output signals from said counting means and from said second generator and delivering an output signal upon the concurrence of said input signals, whereby said third means delivers an output signal in response to the rate of occurrence of pulse signals of an output signal from said second means exceeding a predetermined rate.

18. Cardiographic signal processing means comprising first means having an input of said receiving a cardiographic information signal including a QRS wave complex signal and delivering an output signal related to the differential of the input signal, second means receiving the output signal from said first means and delivering an output pulse signal for each input signal exceeding a predetermined amplitude, whereby an amplitude varying input signal responsively produces one or more related pulse signals for each QRS wave complex signal of the received information signal, third means having an input for receiving said cardiographic signal and delivering output signals for signals exceeding a predetermined amplitude, fourth means receiving the output signals of second means and delivering an output signal having a duration which is at least as long as the duration of the output signal from said first means, and a gate circuit receiving the respective output signals from said third and fourth means and delivering the output signals from said third means in the absence of an output signal from said fourth means, whereby said gate delivers ouput signals for signals received at the input of said first means having an amplitude exceeding a predetermined amplitude except during the time of delivery of an output signal by said second means, said third means including a band pass filter receiving input signals and a threshold dectector receiving signals from the band pass filter and delivering output pulse signals for input signals exceeding a second predetermined amplitude which has a value lower than that of said second means, and said fourth means including a pulse signal generator delivering an output signal upon receiving the first pulse signal of an output signal corresponding to a QRS wave complex signal of the received information signal from said second means having a duration which is at least as long as the duration of the output signal from said first means.

19. The means of claim 18 in which said third means includes a differentiator circuit providing, to said gate circuit, an output pulse signal for the trailing edge of the output pulse signal received from the threshold detector.

20. Cardiographic signal processing means comprising an input for receiving a cardiographic information signal, rectifying means receiving an input signal and delivering a rectified output signal, a threshold detector receiving the rectified signals from the rectifier means and delivering an output indicating signal when the input signal exceeds a predetermined amplitude, and a low pass filter receiving signals from said input and delivering output signals to said rectifying means and in which said rectifying means is an absolute value full wave rectifier and the predetermined threshold value of said detector exceeds the maximum value of a cardiographic signal which is to be received at said input, whereby an output indicating signal is provided for the delivery of an information signal which includes a base line off set signal so that it does not properly represent a pure cardiographic signal.

21. A method of processing cardiographic signals comprising the steps of
 a. receiving a cardiographic analogue information signal including a QRS wave complex signal,
 b. deriving a differential signal of said analogue signal,
 c. providing an output pulse signal during each time the differential signal exceeds a predetermined amplitude to produce one or more pulses corresponding with the QRS wave complex signal of the received information signal,
 d. determining from the number and spacing of pulse signals provided in step (c) corresponding to a QRS wave complex signal of the received information signal whether the received information signal is of pure cardiological origin, and
 e. providing an indication signal indicating whether the received information signal is not of pure cardiological origin.

22. The method of claim 21 including the step of rectifying the differential signal of step (b) prior to providing the output pulse signals.

23. The method of claim 22 including the step of adjusting the peak amplitude of the differential signal of step (b) to a predetermined value prior to the step of rectifying the differential signal.

24. The method of claim 23 in which the output pulse signal of step (c) is provided only for signals with a duration exceeding a predetermined duration.

25. The method of claim 24 which includes the step of removing all signals above a predetermined frequency prior to deriving the differential signal of step (b).

26. The method of claim 21 in which an indication signal is delivered indicating that the received information signal is not of pure cardiological origin when the output pulse signals provided by step (c) for an information signal received in step (a) has more than a predetermined number of pulse signals during a predetermined time period corresponding to the duration of the QRS wave complex signal of the received information signal.

27. The method of claim 26 in which an indication signal is delivered indicating that the received information signal is not of pure cardiological origin when the output pulse signals provided by step (c) for an information signal received in step (a) is fewer in number than a predetermined number of pulse signals during a predetermined time period corresponding to the duration of the QRS wave complex of the received information signal, and when the output pulse signals provided by step (c) for an information signal received in step (a) has a rate of occurrence from one pulse to the next pulse which exceeds a predetermined pulse rate.

28. The method of claim 21 in which an indication signal is delivered indicating that the received information signal is not of pure cardiological origin when the output pulse signals provided by step (c) for an information signal received in step (a) is fewer than a predetermined number of pulse signals during a predetermined time period corresponding to the duration of the QRS wave complex signal of the received information signal.

29. The method of claim 21 in which an indication signal is delivered indicating that the received information signal is not of pure cardiological origin when the output pulse signals provided by step (c) for an information signal received in step (a) have a rate of occurrence from one pulse to the next pulse which exceeds a predetermined pulse rate.

30. A method of processing cardiographic signals comprising the steps of
 a. receiving a cardiographic analogue information signal including a QRS wave complex signal,
 b. deriving a differential signal of said analogue signal,
 c. providing an output pulse signal during each time the differential signal exceeds a predetermined amplitude to produce one or more pulses corresponding with the QRS wave complex signal of the received information signal,
 d. providing an output pulse signal during each time that the information signal received in step (a) exceeds a predetermined amplitude, and
 e. delivering an indication signal indicating the presence of base line noise signals in the received information signal when output signals of step (d) occur at any time except during the time interval of occurrence of the output pulse signals of step (c) corresponding to the QRS wave complex signal of the received information signal.

31. The method of claim 30 including the step of removing all signals above a predetermined frequency prior to deriving the output pulse signals of step (d) and in which output pulses are provided for signals having a second predetermined amplitude lower than the predetermined amplitude for providing output pulses in step (c), and the time interval of the output pulse signal of step (c) is initiated with the delivery of the first output pulse of step (c) and extends for a predetermined time interval which is at least as long as the duration of the output pulses of step (c) corresponding to the QRS wave complex signal of the received information signal.

32. A method of processing cardiographic signals comprising the steps of
 a. receiving a cardiographic analogue information signal,
 b. eliminating all frequency components of the signal of step (a) except for very low frequency components,
 c. rectifying the low frequency components of the cardiographic signal of step (b),
 d. detecting the amplitude of said signal of step (c) for amplitudes exceeding a predetermined value which is greater than the maximum amplitude of the information signal received in step a),
 e. and delivering an output indicator signal for the occurrence of signal amplitudes in step (d) exceeding said predetermined value for indicating base line off set for the signal received in step (a).

33. The method of claim 32 in which in step (c) the signal is subjected to full wave absolute rectification and in step (b) substantial all frequency components above 2 Hz are eliminated.

* * * * *